United States Patent
Buches

(10) Patent No.: US 7,685,638 B1
(45) Date of Patent: Mar. 23, 2010

(54) DYNAMIC REPLACEMENT OF SYSTEM CALL TABLES

(75) Inventor: David Buches, Westlake Village, CA (US)

(73) Assignee: Symantec Corporation, Mountain View, CA (US)

( * ) Notice: Subject to any disclaimer, the term of this patent is extended or adjusted under 35 U.S.C. 154(b) by 1057 days.

(21) Appl. No.: 11/302,706

(22) Filed: Dec. 13, 2005

(51) Int. Cl.
G06F 11/00 (2006.01)
(52) U.S. Cl. .......................................... 726/22; 726/23
(58) Field of Classification Search .............. 726/22–25
See application file for complete search history.

(56) References Cited

U.S. PATENT DOCUMENTS

| | | | |
|---|---|---|---|
| 5,899,987 A * | 5/1999 | Yarom ............................ 707/3 |
| 5,956,507 A * | 9/1999 | Shearer et al. .............. 718/104 |
| 6,272,519 B1 * | 8/2001 | Shearer et al. .............. 718/104 |
| 6,385,727 B1 | 5/2002 | Cassagnol et al. |
| 6,438,666 B2 | 8/2002 | Cassagnol et al. |
| 6,735,703 B1 | 5/2004 | Kilpatrick et al. |
| 6,772,332 B1 | 8/2004 | Boebert et al. |
| 6,823,433 B1 | 11/2004 | Barnes et al. |
| 6,854,039 B1 | 2/2005 | Strongin et al. |
| 6,988,226 B2 | 1/2006 | Koning et al. |
| 7,007,301 B2 | 2/2006 | Crosbie et al. |
| 7,152,242 B2 | 12/2006 | Douglas |
| 7,260,845 B2 | 8/2007 | Kedma et al. |
| 2002/0016918 A1 * | 2/2002 | Tucker et al. ............... 713/190 |
| 2002/0129245 A1 | 9/2002 | Cassagnol et al. |
| 2003/0074487 A1 * | 4/2003 | Akgul et al. ................ 709/328 |
| 2003/0093686 A1 | 5/2003 | Barnes et al. |
| 2003/0188169 A1 | 10/2003 | Strongin et al. |
| 2003/0188178 A1 | 10/2003 | Strongin et al. |
| 2003/0226014 A1 | 12/2003 | Schmidt et al. |
| 2003/0226022 A1 | 12/2003 | Schmidt et al. |
| 2004/0049693 A1 * | 3/2004 | Douglas ...................... 713/200 |
| 2005/0076186 A1 * | 4/2005 | Traut ............................. 712/1 |
| 2005/0091558 A1 * | 4/2005 | Chess et al. ................... 714/38 |
| 2005/0120236 A1 | 6/2005 | Witmann |
| 2005/0204205 A1 | 9/2005 | Ring et al. |
| 2005/0228990 A1 | 10/2005 | Kato et al. |
| 2005/0229250 A1 | 10/2005 | Ring et al. |
| 2006/0075381 A1 * | 4/2006 | Laborczfalvi et al. ....... 717/100 |
| 2006/0101413 A1 * | 5/2006 | Kinno et al. ................. 717/127 |
| 2006/0179484 A1 * | 8/2006 | Scrimsher et al. ............. 726/23 |

(Continued)

OTHER PUBLICATIONS

Butler, J. et al., "VICE—Catch the hookers!", In Black Hat USA, Jul. 2004, 61 pages, [online] Retrieved from the Internet <URL:http://www.blackhat.com/presentations/bh-usa-04/bh-us-04-butler/bh-us-04-butler.pdf>.

(Continued)

*Primary Examiner*—Kimyen Vu
*Assistant Examiner*—John B King
(74) *Attorney, Agent, or Firm*—Fenwick & West LLP

(57) ABSTRACT

Techniques are disclosed that exploit system call mechanism to effect robust security applications. In one particular case, security software is able to effectively "sandbox" user mode applications at the thread granularity level, by replacing the system call mechanism of the operating system with a custom mechanism that limits the rights available to a target application that is vulnerable to malicious attack. The techniques allow the security software to create service tables with varying degrees of security levels, and do not impact performance of non-targeted running processes/threads.

17 Claims, 6 Drawing Sheets

U.S. PATENT DOCUMENTS

2008/0016314 A1    1/2008  Li et al.

OTHER PUBLICATIONS

Keong, T.C., "SIGA2 G-TEC—Win2K Kernel Hidden Process/Module Checker 0.1 (Proof-Of-Concept)," May 23, 2004, [online] [Retrieved on May 15, 2006] Retrieved from the Internet<URL:http://www.security.org.sg/code/kproccheck.html>, 6 pages.

"Notes from "Windows NT System—Call Hooking" (Dr. Dobb's Journal, '97)," [online] [Retrieved on May 15, 2006] Retrievedfrom the Internet<URL:http://www.stanford.edu/~stinson/misc/curr_res/hooks/nt_hooking.txt>, 9 pages.

Rutkowska, J., "System Virginity Verifier: Defining the Roadmap for Malware Detection on Windows System," Hack In The Box Security Corporation, Sep. 28-29, 2005, Retrieved from the Internet<URL:http://www.invisiblethings.org/papers/hitb05_virginity_verifier.ppt>, 38 pages.

* cited by examiner

DYNAMIC REPLACEMENT OF SYSTEM CALL TABLES

RELATED APPLICATIONS

This application is related to U.S. application Ser. No. 11/213,289, filed Aug. 26, 2005, titled "Detection of Sysenter/Syscall Hijacking", which is herein incorporated in its entirety by reference.

FIELD OF THE INVENTION

The invention relates to the field of computing systems, and more particularly, to providing for replacement of system call tables to provide robust security applications.

BACKGROUND OF THE INVENTION

In general, most operating systems include a kernel configured for providing the core services, and a shell or applications that use the kernel services and provide a user interface. In addition, most operating systems have two modes of operation: a privileged level where the kernel resides, and an unprivileged level where the application and system processes execute. A ring transition mechanism is used to move from one mode to the other.

A system call is a mechanism with which application and system processes access the services provided by the operating system. A system call typically involves a ring transition to the kernel where the required function is then performed. Traditionally this is achieved by using a trap (interrupt) mechanism that transitions into the kernel to execute the required function. Intel introduced the SYSENTER/SYSEXIT based fast system call mechanism (FSCM) for its x86 processor architectures to efficiently handle ring-transition oriented system calls. Similarly, Advanced Micro Devices has a SYSCALL/SYSRET based FSCM for its x64 processor architectures to efficiently handle ring-transition oriented system calls.

For instance, on Windows XP systems, every thread in the system contains an embedded pointer to a table of functions on x86 systems (or offsets to functions on x64 systems) that an FSCM utilizes to dispatch operating system calls from user mode applications. Other multithreading operating systems have similar functionality and mechanisms.

The FSCM essentially performs the same function on most computing systems, although it typically is implemented in a slightly different manner depending on the processor of the system (e.g., x64 processors by Advanced Micro Devices implement FSCM slightly different from how x86 processors by Intel FSCM). When a SYSENTER on x84 (or SYSCALL on x64) instruction is emitted, the processor's instruction pointer is set to a value stored in a model specific register (MSR). This register is populated very early in the operating system's startup process. The routine pointed to by the FSCM MSR is a highly optimized operating system (OS) specific routine that handles among other tasks, dispatching the call using the correct system call table for the thread currently being executed.

What is needed are techniques that exploit such system call mechanisms to effect robust security applications on targeted processes/threads. Such techniques should operate without impacting performance of any other running processes/threads.

SUMMARY OF THE INVENTION

One embodiment of the present invention provides a method for dynamically replacing a system call table for applications targeted for security checking. The method includes identifying a target process, and allocating an alternate service descriptor table (SDT) object for the target process. The method includes installing one or more security hook routines in the alternate SDT, and associating the alternate SDT with threads in the target process. Upon each call issued by a thread of the target process, the method may further include executing one or more of the security hook routines of the alternate SDT. In one particular embodiment, the target process is effectively "sandboxed" once its user mode threads are associated with the alternate SDT, and in response to a user mode thread within the sandboxed target process creating a new thread, the method further comprises associating the alternate SDT with the new thread. In response to determining that the one or more security hook routines have not completed execution, the method may include selectively waiting for hook routine completion (e.g., based on watchdog timer or pre-set number of attempts by security routine for successful completion). In response to determining that the one or more security hook routines have completed execution, the method may include transferring control to a native service of the target application, or back to the calling thread with an error status. In response to the error status indicating that hook routine security checking failed, the method may include remedial processing. In one such case, the remedial processing includes at least one of sending a notification of malicious activity, identification of the malicious activity, impeding the malicious activity, containing the malicious activity, and observing the malicious activity.

Another embodiment of the present invention provides a machine-readable medium (e.g., compact disk, diskette, server, or hard drive) encoded with instructions, that when executed by a processor, cause the processor to carry out a process for dynamically replacing a system call table for applications targeted for security checking. This process can be, for example, similar to or a variation of the previously described method.

Another embodiment of the present invention provides a system for dynamically replacing a system call table for applications targeted for security checking. The system includes a storage (e.g., database or other storage mechanism) for storing one or more security hook routines, and an alternate service descriptor table (SDT) module. The alternate SDT module is for allocating an alternate SDT object for a target process, and installing one or more of the security hook routines from the storage in the alternate SDT, and associating the alternate SDT with threads in the target process. Upon each call issued by a thread of the target process, the system may execute one or more of the security hook routines of the alternate SDT. In one particular case, the target process is effectively sandboxed once its user mode threads are associated with the alternate SDT, and in response to a user mode thread within the sandboxed target process creating a new thread, the system further comprises a hook routine for associating the alternate SDT with the new thread. In response to determining that the one or more security hook routines have completed execution, the system may transfer control to a native service of the target application, or back to the calling thread with an error status. In response to the error status indicating that hook routine security checking failed, the system may execute remedial processing. The remedial processing may include, for example, at least one of sending a notification of malicious activity, identification of the malicious activity, impeding the malicious activity, containing the malicious activity, and observing the malicious activity.

Another embodiment of the present invention provides a system for dynamically replacing a system call table for applications targeted for security checking. This particular embodiment includes a means for storing one or more security hook routines, a means for allocating an alternate service descriptor table (SDT) object for a target process, a means for installing one or more of the security hook routines from the means for storing in the alternate SDT, and a means for associating the alternate SDT with threads in the target process. The system may further include a means for executing one or more of the security hook routines of the alternate SDT, upon each call issued by a thread of the target process. In one particular embodiment, the target process is effectively sandboxed once its user mode threads are associated with the alternate SDT, and in response to a user mode thread within the sandboxed target process creating a new thread, the system further comprising means associating the alternate SDT with the new thread.

Note that other embodiments can be configured for dynamically replacing a system call table for applications targeted for any type of checking and/or monitoring, and the present invention is not intended to be limited to applications targeted for security checking. For instance, targeted applications could be checked for compliance with rules set by a network administrator (e.g., rule that limits access to particular applications to a set number of accesses) or rules defining proper programming techniques (e.g., rule requiring executable applications with too many GoTo statements to be flagged for recoding in accordance with structured programming techniques). Many applications will be apparent in light of this disclosure.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

Figure 1A:
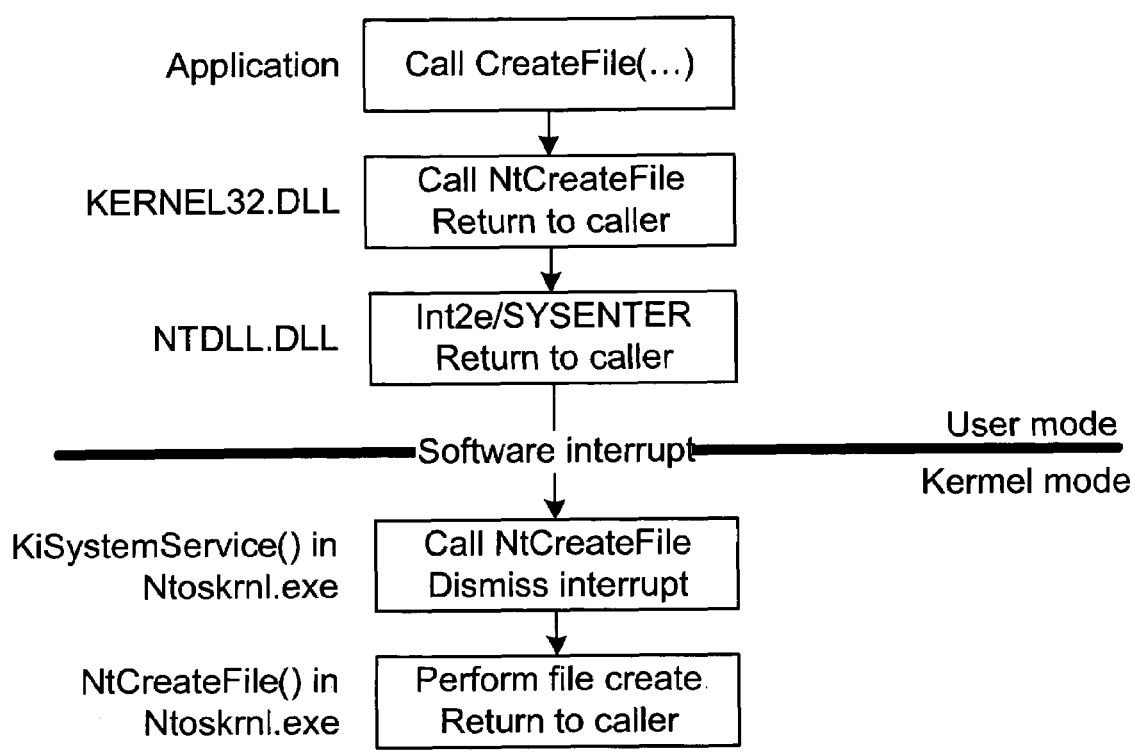
FIG. 1a illustrates a conventional system service dispatching process.

Note that the figures use like reference numerals to identify like elements. A letter after a reference numeral, such as "114A," indicates that the text refers specifically to the element having that particular reference numeral. A reference numeral in the text without a following letter, such as "114," refers to any or all of the elements in the figures bearing that reference numeral (e.g. "114" in the text refers to reference numerals "114A," "114B," and/or "114C" in the figures).

DETAILED DESCRIPTION OF THE INVENTION

Techniques are disclosed that exploit system call mechanisms to effect robust security applications. In one particular case, security software is able to effectively "sandbox" user mode applications at the thread granularity level, by replacing the system call mechanism of the operating system with a custom mechanism that limits the rights available to the application. The techniques allow the security software to create service tables with varying degrees of security levels, and do not impact performance of non-targeted running processes/threads.

Overview

In one particular embodiment of the present invention, the routine stored in the FSCM MSR is replaced with a security routine. This security routine can then replace the system call table for a target thread that has issued a call. This replacement can be carried out on a programmatically determined basis. The security software can be configured to create replacement system call and service tables that have a varying degrees of security levels. Note that "replacing" a system call table can be achieved by providing an alternate table for target threads, while other threads continue to refer to the normally used global table.

For example, consider the LSASS (local security authority subsystem service). LSASS is a process in Microsoft Windows operating systems that verifies users logging in to a Windows computer or server. For a service like LSASS, which is attacked with some frequency, a separate "alternate" service table can be allocated and assigned to all threads within the LSASS process. As will be apparent in light of this disclosure, this alternate table can have dozens of APIs being watched by the security software, without impacting performance of any other running processes/threads that remain associated with the global call table.

The embodiments described herein are discussed in terms of Microsoft Windows operating systems. However, the present invention is not intended to be limited to any one particular operating system. Rather, embodiments of the invention can be used in any operating system that employs a fast system call mechanism or similar dispatcher.

System Service Dispatching

Before describing architecture configured in accordance with embodiments of the present invention, the following background information is provided with regard to Microsoft operating systems, so as to provide an example context for various embodiments of the present invention. Other contexts and embodiments will be apparent in light of this disclosure.

Microsoft Windows NT-based operating systems (e.g., Windows NT4, Windows 2000, Windows XP, Windows Server 2003, etc) provide a rich set of operating system primitives to application developers in order to allow them to develop feature rich applications (such as Microsoft Word and Visio). This mechanism is generally known as an application programming interface (API), and is specifically referred to as the Win32 API.

How the operating system implements the Win32 API can be illustrated by way of example, and with reference to FIG. 1a, which illustrates a conventional system service dispatching process. For this example, assume a programmer wishes to develop a text editor application (generally designated as "Application" in FIG. 1a). Among the many tasks the editor application will have to perform is file I/O. Basic file IO functions (e.g., create/read/write) are provided to the application by the Win32 subsystem in a dynamic link library (DLL). In this example, these services are exported from KERNEL32.DLL. KERNEL32.DLL exports many services, but for this example, assume the CreateFile( ) service is used.

At some point, when the editor application determines that it needs to open a file on disk, it will call the CreateFile( ) service. The user mode portions of the Win32 CreateFile( ) service reside in KERNEL32.DLL. The KERNEL32.DLL implementation of the CreateFile( ) service performs some transformations on it's input parameters before calling the native NtCreateFile( ) service exported by NTDLL.DLL, as shown in FIG. 1a. NTDLL.DLL contains the user mode interfaces for native Windows NT system calls. These functions are simple stub routines that trap to kernel mode via either a software interrupt (int2e) or a SYSENTER instruction, as shown. Prior to trapping to kernel mode, these functions store off the system service identifier (SSID) into a register (usually the EAX register, or other suitable user-kernel transition register). SSIDs are offsets into a service descriptor table (SDT). An SDT contains mappings from SSIDs to the addresses of the functions that implement the actual services. On Windows NT systems, there exists a global service descriptor table array (KeServiceDescriptorTable), which each and every running thread uses to map SSIDs to native function addresses. Every running thread in the system contains a pointer to the service table to be used when native services are invoked.

When the thread traps to kernel mode, control is transferred to an internal Windows NT kernel service called KiSystemService( ) in Ntoskrnl.exe, as shown in FIG. 1a. This function among other things, extracts the SDT to be used from the running thread, and using this table and the SSID stored in the EAX register, computes the address of the code that actually implements the service, and transfers control to that computed address.

System Service Dispatch Table Hooking

Software vendors can hook system service calls by modifying the function addresses that are stored in the global KeServiceDescriptorTable object previously mentioned. By storing off the original contents of a SSID entry in the KeServiceDescriptorTable, and replacing with an alternate address, the code stored at the alternate address obtains control and can be configured to add value to the operating system. For example, the hook routine can be programmed to perform security checking or buffer overflow checking. Once this hook routine has executed, control can then be transferred to the native service, or transferred back to the calling thread with an error status.

Figure 1B:
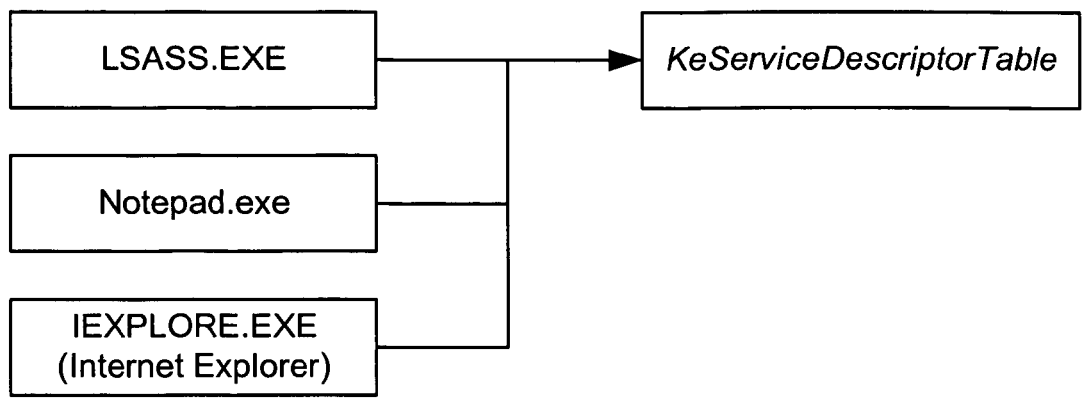
FIG. 1b illustrates a typical relationship between a global service descriptor table and each process running in the host system.

One problem with this approach is that by modifying the global KeServiceDescriptorTable, the performance of all threads in the operating system is affected, since every thread in every process in the system refers to this object when processing system service dispatch operations. FIG. 1b illustrates this conventional relationship between the global KeServiceDescriptorTable (or other global SDT) and each process running in the system. As can be seen, each of the shown executable processes (which in this example include LSASS.EXE, Notepad.exe, and IEXPLORE.EXE) refers to the global KeServiceDescriptorTable object when processing system service dispatch operations.

Dynamic Replacement of System Call Table

In the real world, there are a number of applications (e.g., such as Internet Explorer) that are frequent targets of hackers, spyware vendors, and others with varying degrees of malicious intent. Consider the example case where a security software company wants to limit the behavior of an instance of Internet Explorer. As discussed with reference to FIG. 1b, one could install hooks in the global service descriptor table (SDT) for various "interesting" services (e.g., NtCreateFile( ) and other such services that can be maliciously exploited). However, and as previously explained with reference to FIG. 1b, the problem with this approach is that overall system performance suffers, since every thread in the system that called a hooked function would be impacted by the global hook.

Using dynamic replacement of system call tables in accordance with an embodiment of the present invention, all of the threads of a specific process can be effectively "sandboxed" by allocating a replacement or alternate SDT object, installing hooks in the replacement SDT, and associating the alternate SDT with every thread in the target process dynamically (upon thread invocation). As is generally known, a sandbox is a security mechanism for safely running programs. It can be used, for example, to execute untested code, or programs from unverified/untrusted third-parties. A sandbox can be configured to provide a select set of resources with which guest or otherwise suspect programs can operate, such as scratch space on disk and/or memory, and a set of security routines and/or policies with which programs must be compliant before gaining trusted status. Until trust is confirmed, suspect programs have restricted network access, and limited or no ability to inspect the host system or read from input devices. Many sandbox schemes will be apparent in light of this disclosure, and the present invention is not intended to be limited to any one such scheme.

Figure 1C:
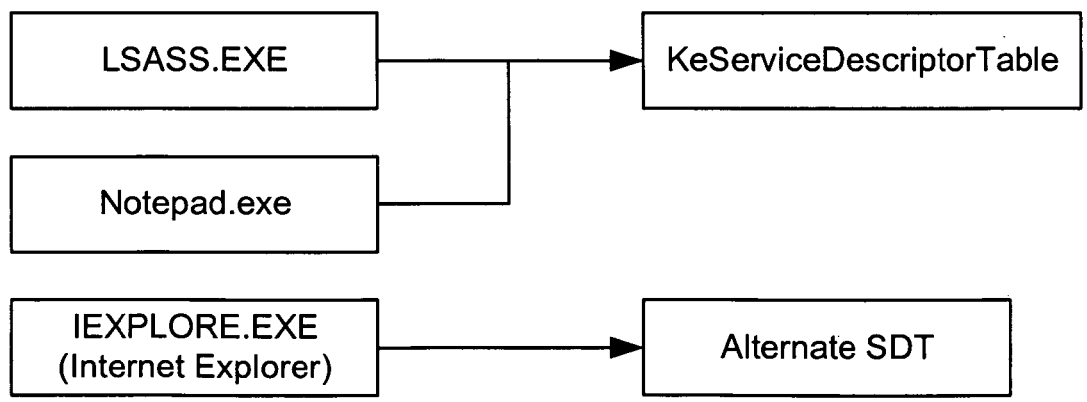
FIG. 1c illustrates a relationship between a global service descriptor table, an alternate service descriptor table, and each process running in the host system, in accordance with one embodiment of the present invention.

FIG. 1c illustrates a relationship between a global service descriptor table, an alternate service descriptor table, and each process running in the host system, in accordance with one embodiment of the present invention. As can be seen, two of the executable processes (LSASS.EXE and Notepad.exe) each refer to the global KeServiceDescriptorTable object when processing system service dispatch operations. However, a third executable process (IEXPLORE.EXE, which is the executable file for Internet Explorer) has been sandboxed, in that all of the threads of that process refer to an alternate service descriptor table. Once the new SDT relationship is established between the threads of the target process (which in this example is IEXPLORE.EXE), extensive security checks can be added to calls made through the alternate SDT object. While these security checks can impact the performance of the target process, they will not impact the performance of any other threads in the system, as the global SDT object remains unencumbered. Note that although only one target process is shown in this example, there can be any number of target processes, each having its own alternate SDT object. For instance, LSASS.EXE and Notepad.exe could also each be associated with an alternate SDT object. The security hook routines of each alternate SDT object may be the same, or can be different, depending on the nature and parameters of the application being checked.

System Architecture

Figure 2:
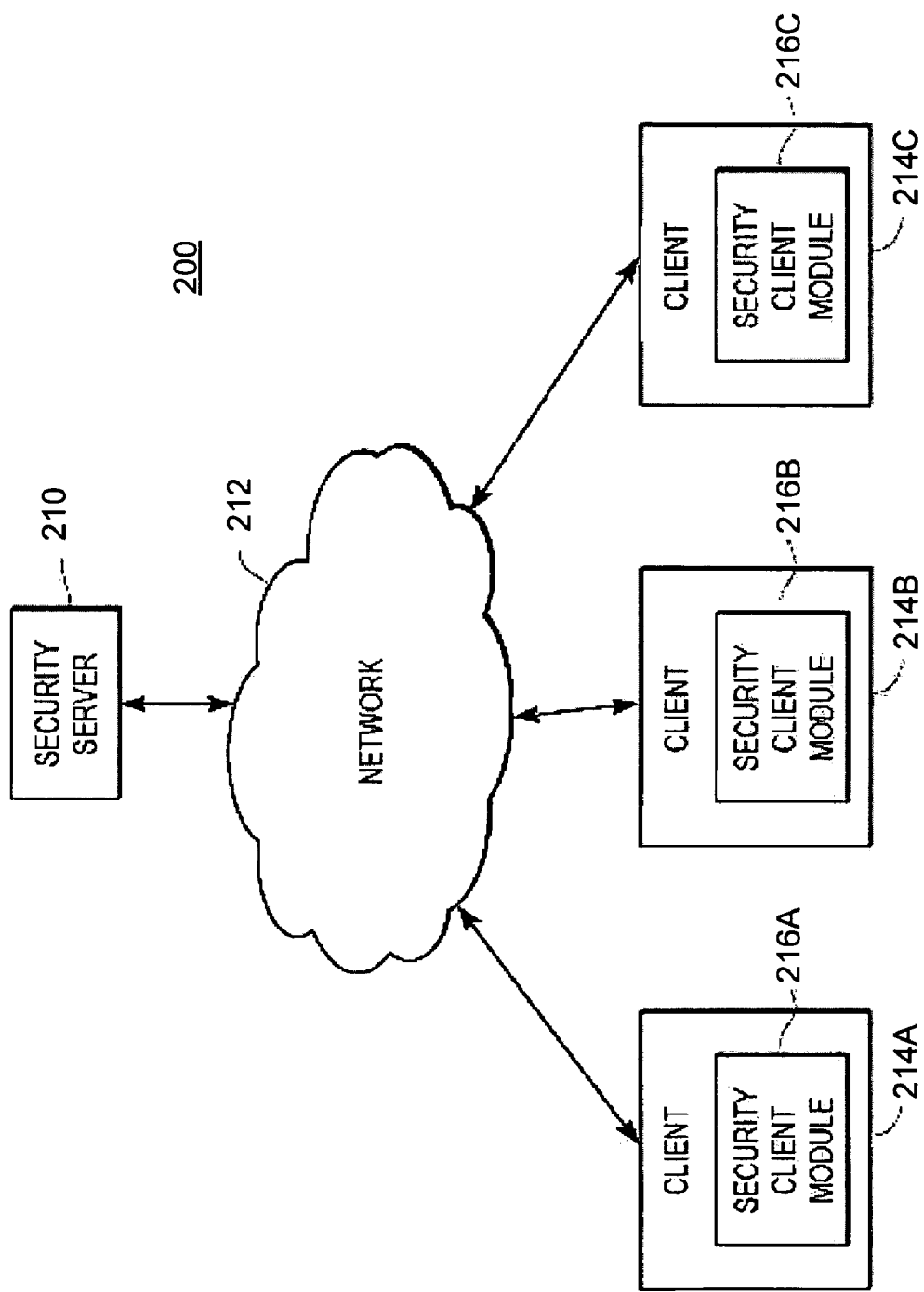
FIG. 2 is a block diagram of a computing environment configured in accordance with an embodiment of the present invention.

FIG. 2 is a block diagram of a computing environment configured in accordance with an embodiment of the present invention. As can be seen, the computing environment 200 includes a security server 210 connected to a network 212. The network 212 is also connected to multiple client computers 214, each of which includes a security client module 216.

The network 212 may be any type of communications network, such as a local area network (e.g., intranet), wide area network (e.g., Internet), or some combination thereof. Alternatively, the network 212 may be a direct connection between a client computer 214 and the security server 210. In general, the client computers 214, network 212, and/or the security server 210 may be in communication via any type of wired and/or wireless connection, using a wide variety of communication protocols (e.g., TCP/IP, HTTP, SMTP, FTP), encodings or formats (e.g., HTML, XML), and protection schemes (e.g., VPN, secure HTTP, SSL). Alternatively, the security server 210 may indirectly communicate with the client computer 214 via U.S. mail or other such delivery service, where a processor readable medium (e.g., compact disk or floppy disk) is sent to the street address where one of the clients 214 is located. This processor readable medium can be encoded with instructions and/or data files that can be loaded, executed and/or otherwise used by the client 214.

The security server 210 is provided by a security software vender or other entity, and can include one or more standard computer systems configured to communicate with client computers 214 via the network 212. For example, the security server 210 can include a web server, FTP server, or other technology that enables the security server 210 to interact with the client computers 214 via the network 212. In one embodiment, the security server 210 provides security code (e.g., alternate SDT module and/or security hook routines for installation into an alternate SDT) to the client computers 214, for enabling dynamic replacement of system call tables for select applications or services. The security server 210 may also provide to clients 214, for example, signatures and security code for detecting malicious software including that which manipulates critical user-kernel transition registers (e.g., SYSENTER/SYSCALL/SYSEXIT/SYSRET registers), as described in the previously incorporated U.S. application Ser. No. 11/213,289. In addition, the security server 210 can provide signatures of exclusions, which are programs, routines, applications, etc that are known to legitimately manipulate critical user-kernel transition registers, or are otherwise trusted.

The client computer 214 is an electronic device that can host various forms of malicious software, or be otherwise maliciously targeted. In one embodiment, the client computer 214 is a conventional computer system, such as a laptop or desktop system. Alternatively, or in addition to, one or more of the client computers 214 can be a device such as a personal digital assistant (PDA), cellular telephone, smartphone, video game system, or other computing device. The client computer 214 includes an operating system (OS). The OS can be, for example, a Microsoft Windows-compatible OS, Apple OS X, and/or a Linux distribution. Generally stated, the operating system can be any OS that provides a system call mechanism that can be exploited to carry out dynamic replacement of system call tables, as described herein. Such client computers 214 typically store numerous computer files and applications that can host malicious software (e.g., targeting Internet Explorer or other vulnerable applications and processes), as previously explained. Although only three client computers 214 are shown, note that some embodiments of the present invention have only one, while other embodiment may have thousands or millions of such clients.

Malicious software, sometimes called "malware," is generally defined as software that executes on the client computer 214 surreptitiously or that has some surreptitious functionality. Malicious software can take many forms, such as parasitic viruses that attach to legitimate files, worms that exploit weaknesses in the computer's security in order to infect the computer and spread to other computers, Trojan horse programs that appear legitimate but actually contain hidden malicious code, and spyware that monitors keystrokes and/or other actions on the computer in order to capture sensitive information or display advertisements. The executable file that hosts the malicious software can be modified with one or more packers in order to make the malicious software difficult to detect.

The client computer 214 is configured to store and execute a security client module 216 for carrying out various security functions (e.g., detecting the presence of malicious software and/or dynamic replacement of system call tables). The security module 216 can be, for example, incorporated into the OS of the computer 214 or part of a separate comprehensive security package. In one embodiment, the security client module 216 is provided by the entity that operates the security server 210. The security client module 216 can communicate with the security server 210 via the network 212 in order to download security software for carrying out dynamic replacement of system call tables for applications vulnerable to malicious attack. Other downloads may include, for instance, exclusions, signatures and/or other information utilized to detect malicious software and activity.

In this particular example, the term "module" refers to computer program logic for providing the specified functionality. Note, however, that other modules configured in accordance with the principles of the present invention can be implemented in hardware (e.g., gate-level logic), firmware (e.g., microcontroller configured with I/O capability and a number of embedded routines for carrying out dynamic replacement of system call tables), or some combination of software, hardware, and/or firmware. It will be understood in light of this disclosure that the modules described herein represent one embodiment of the present invention. Certain embodiments may include other and/or different modules and functionality. In addition, the embodiments may lack modules described herein and/or distribute the described functionality among the modules in a different manner. In one embodiment, the modules are stored on a storage device of each client 214 as executable files, loaded into local memory, and executed by a local processor as one or more processes.

Security Module

Figure 3:
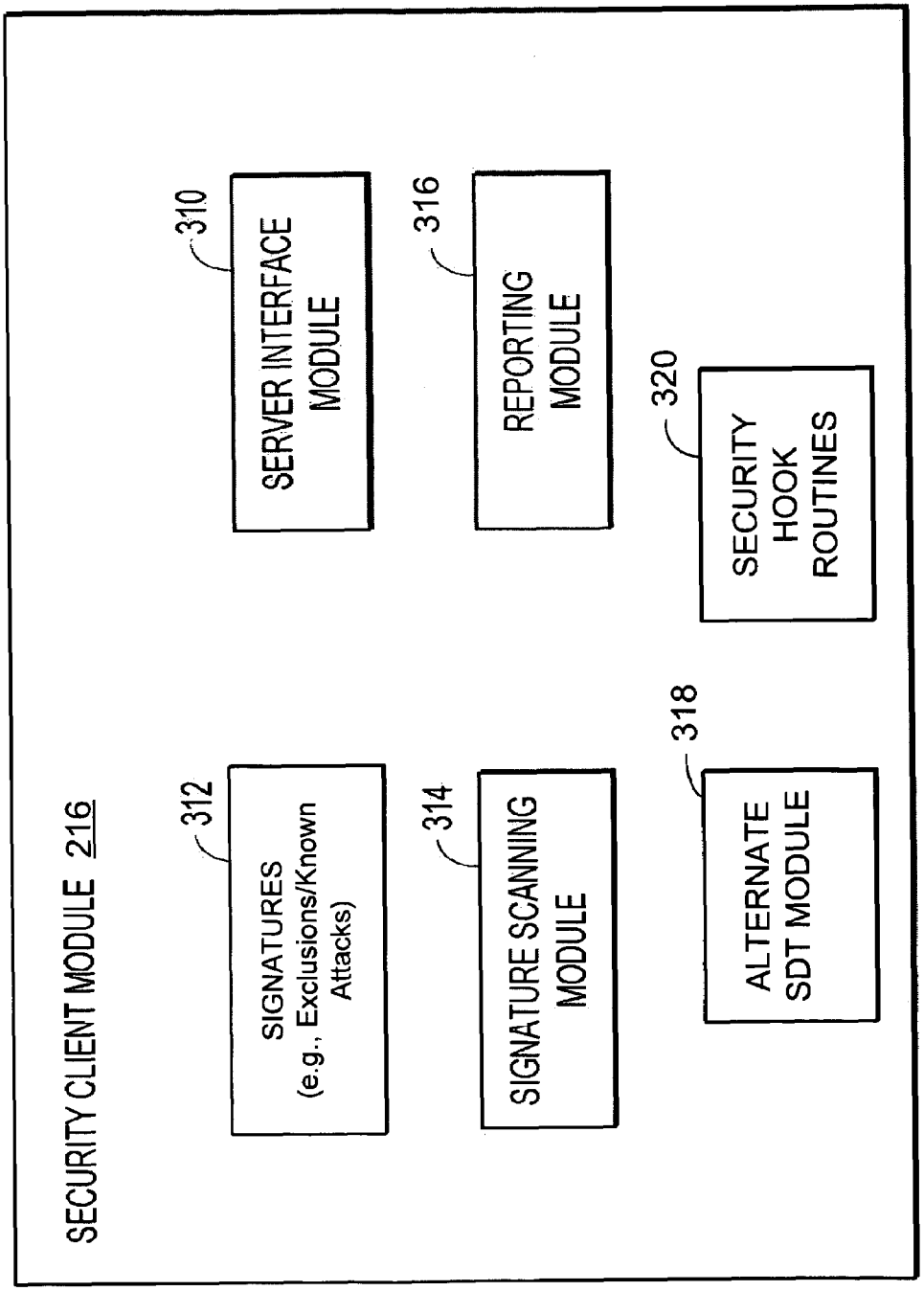
FIG. 3 is a block diagram illustrating modules within a security client module configured in accordance with an embodiment of the present invention.

FIG. 3 is a block diagram illustrating modules within the security client module 216 according to one embodiment of the present invention. As can be seen, the module 216 includes server interface module 310, signature database 312, a signature scanning module 314, a reporting module 316, an alternate service descriptor table (SDT) module 318, and a security hook routine database 320. As previously explained, each of these components can be implemented in software that executes on a processor of a client computer. However, other embodiments (e.g., hardware logic) could be implemented as well, as previously explained. Numerous configurations will be apparent in light of this disclosure.

The server interface module 310 enables communication between the security client module 216 and the security server 210 via the network 212. It may also be programmed or otherwise configured to send and receive information from processes on the local machine 214, or from other devices on the network 212. In one embodiment, the server interface module 310 retrieves security hook routines (e.g., from storage in database 320) and updates to the alternate SDT module 318 (e.g., to more current version). Other security files can also be received from the server 210, such as signatures of known malicious software and exclusions. The security client module 216 may also provide suspect host files to the server 210 (e.g., for security analysis or quarantine). Once module 310 receives security data (e.g., hook routines, signatures and exclusions) from server 110, it updates the security hook routine database 320 and the signature database 312 accordingly.

The signatures database 312 stores signatures of exclusions. As previously explained, exclusions are trusted programs, routines, applications, etc that are known to legitimately perform certain actions. For example, if a register manipulation is detected, then the security client module 216 can be configured to determine if that manipulation was caused by a legitimate source. If not, then the appropriate action can be taken, as will be explained in turn. The signatures database 312 can also be configured to store signatures for identifying known malicious software on the client computer 214, including malware known for targeting certain vulnerable applications (e.g., Internet Explorer) or improper manipulation of registers or other known security threats. In one embodiment, the signatures in the signatures database 312 contain strings, instruction usage records and/or other data that can be used to uniquely identify specific types of malicious software (or trusted software or known security hook routines, for purposes of exclusion from security processing). For example, a signature can contain a specific sequence of values that are found in only a particular virus. If a file stored on a client computer 214 has the sequence of values, then that file is infected with the virus. The signatures are designed to be utilized with executable files, such as those in the WINDOWS PE format, and with other types and formats of files that might contain malicious software.

The signature scanning module 314 scans any program requesting a hook via register manipulation as described herein, as well as files stored (e.g., on RAM, ROM, or disk drive) in client 214 for the presence of the signatures in the signatures database 312.

In one embodiment, the signature scanning module 314 analyzes a file to identify its potential entry points and other locations likely to contain malicious software. The module 314 scans these likely locations to determine whether they contain a signature included in the signatures database 312. Note that known security hook routines can be identified this way as well, and excluded from security processing (unlike suspect or otherwise unknown hook routines). The signature scanning module 314 can also perform additional analysis of files, such as emulating instructions of a file within a virtual machine and then scanning the memory of the virtual machine for matching signatures (another form of sandboxing).

The reporting module 316 can be used to provide a user interface that informs the user of intrusions and security actions taken. Note, however, that no reporting is necessary, in that malicious program requests and other activity could be silently denied or otherwise resolved. In addition, module 316 can also be configured to collect information about newly detected threats and submit them to an analysis agent, such as a remote security response center (e.g., via the server interface module 310 and network 212). The collected information could include, for example, the functional profile of the threat (e.g., what it did to the client computer and how) and/or samples of suspect code related to an unknown hook routine.

The alternate SDT module 318 is programmed or otherwise configured to initialize (e.g., at boot-up of client 214, or upon identification of a vulnerable process that needs to be sandboxed) and carryout the dynamic replacement of system call table scheme described herein. In one such embodiment, the SDT module 318 identifies target processes to be sandboxed, allocates an alternate SDT object for each target process, installs one or more security hook routines in each alternate SDT, and associates each alternate SDT with every thread in the corresponding target process dynamically. Once a hook routine has executed, control is transferred to the native service, or transferred back to the calling thread with an error status.

The security hook routine database 320 (any storage mechanism or facility can be used here, such as disk drive, server, memory, etc) is used to store the various security hook routines that operate on the sandboxed applications. As previously explained, security hook routines can be downloaded from the server 210, via the server interface module 310 and network 212. The alternate SDT module 318 can then retrieve the desired hook routine or routines from the database 320, so that they can be installed in the corresponding alternate SDT. A hook routine can be programmed to perform any type of security checking function, such as those discussed with reference to the signature scanning module 314. Others might include, for example, determining if the target application is running with up-to-date security patches, or if the target application has active scripting enabled (e.g., in the case of browser application).

In one particular embodiment, one hook installed in the alternate SDT is for the ZwCreateThread( ) system API. This hook executes on the successful completion of a call to the native NtCreateThread( ) service. At this point of successful completion, the hook procedure has direct access to the newly created KTHREAD object. The new thread's KeServiceDescriptorTable pointer is then updated to point to the alternate SDT. In this way, threads created after the initial sandboxing of a process's thread are also sandboxed. Thus, each thread of the sandboxed process (whether original or subsequently created) is associated with the alternate SDT.

Note that the database 320 can be integrated into the alternate SDT module 318, if so desired. The modules are shown in FIG. 3 as being distinct from one another for the purpose of illustration. Other configurations and variations will be apparent in light of this disclosure.

Methodology

Figure 4A:
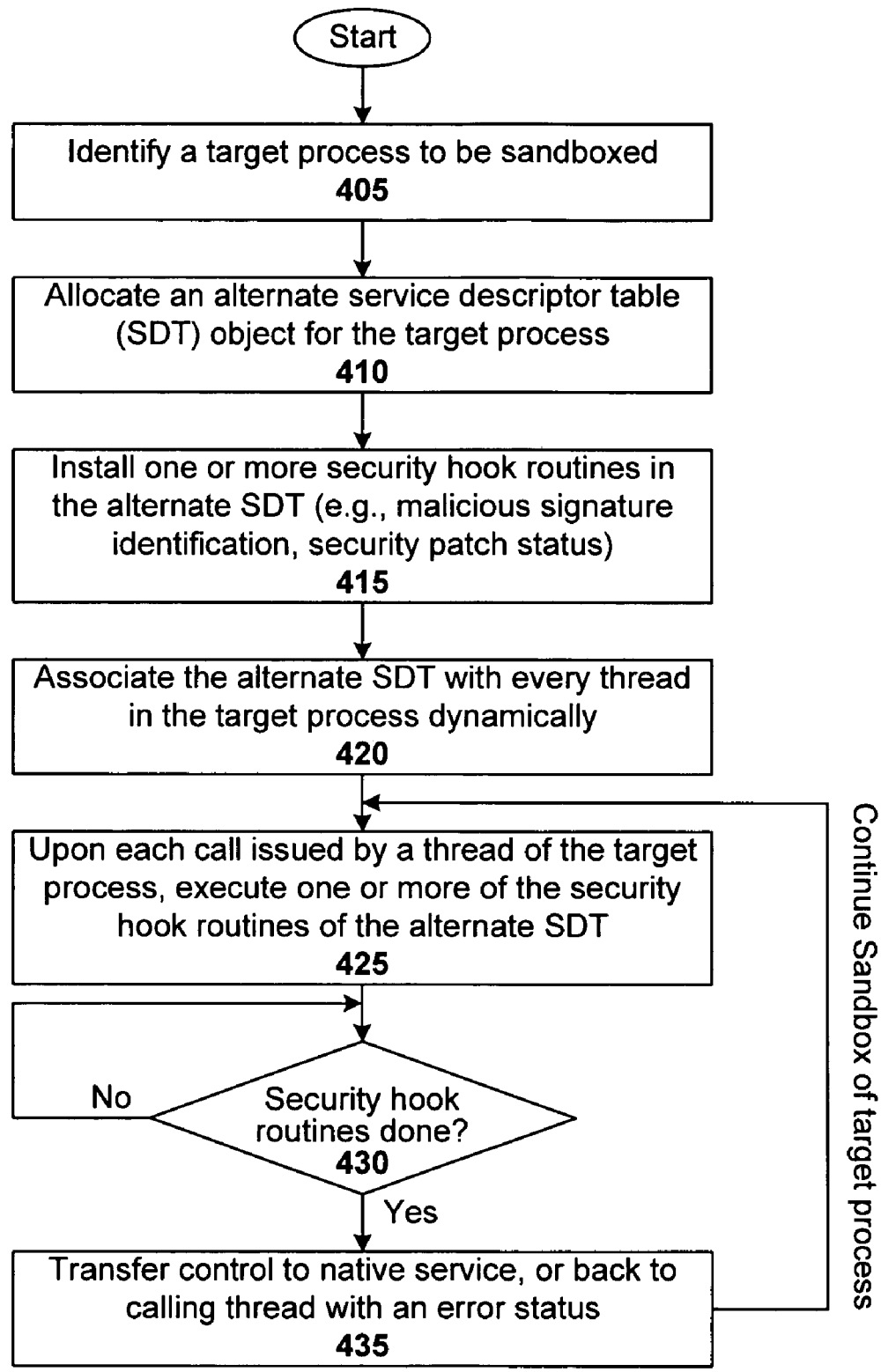
FIG. 4a illustrates a method for dynamically replacing a system call table for targeted applications vulnerable to malicious attack in accordance with an embodiment of the present invention.

FIG. 4a illustrates a method for dynamically replacing a system call table for targeted applications vulnerable to malicious attack in accordance with an embodiment of the present invention. This method can be carried out, for example, by the alternate SDT module 318 and the security hook routine database 320 as described with reference to FIG. 3. As previously explained, these modules can be implemented as executable code encoded on a machine-readable medium.

The method begins with identifying 405 a target process to be sandboxed. The targeted process can be any process that is vulnerable to malicious attack (e.g., LSASS.EXE, Notepad.exe, and IEXPLORE.EXE), or any process a security system wishes to restrict or otherwise monitor. The method continues with allocating 410 an alternate service descriptor table (SDT) object for the target process. This allocation can be performed, for example, at boot-up of the host system or real-time upon discovery of a process to be security screened. In one such embodiment, the alternate SDT object is allocated in RAM of the host system, or in any memory that can be readily accessed by the host system.

The method continues with installing 415 one or more security hook routines in the alternate SDT. As previously explained, the function addresses that are stored in the SDT object each point to a security hook routine (or other executable code) that, upon a system call to that table, obtains control and can be configured to add value to the host operating system. For example, the hook routine can be programmed to perform security checking, buffer overflow checking, malicious signature identification, and security patch status verification.

The method continues with associating 420 the alternate SDT with every thread in the target process dynamically. This association can be performed, for example, upon thread invocation or within the preliminary steps of thread execution. Upon each call issued by a thread of the target process, the method continues with executing 425 one or more of the security hook routines of the alternate SDT. The method continues with determining 430 if the security hook routines done. If not, the method continues to wait for completion of the hook routine(s). In one such embodiment, a watchdog timer can be employed to prevent indefinite looping or a hung system.

If the security hook routine(s) complete (or time-out), the method continues with transferring 435 control to the native service (e.g., NtCreateFile( ) service), or back to calling thread with an error status. The error status can be, for example, a flag that indicates security checking performed by the hook routines passed, thereby allowing normal process flow. However, if the error status indicates a security breach of some kind (e.g., malicious code), then a remedial process flow can ensue. For instance, the application can remain sandboxed, such that its access to resources of the host system and/or network are restricted. In addition, infection notification can be sent to the host system and/or to an online security threat analysis center. Identified malicious code can be removed or quarantined, or malicious activity can be blocked or otherwise impeded and observed.

Figure 4B:
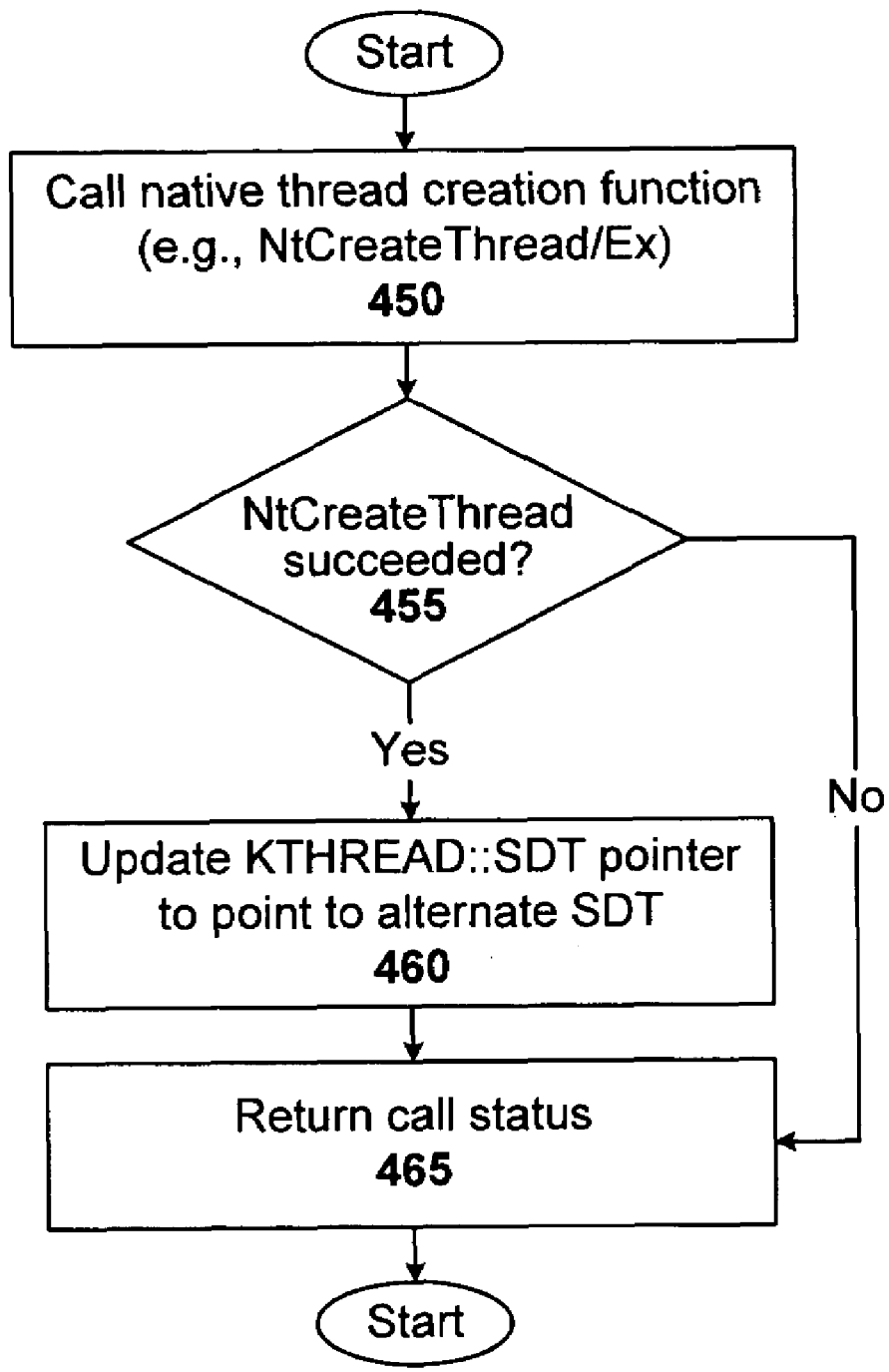
FIG. 4b illustrates a method for dynamically sandboxing process threads that are newly created, in accordance with one embodiment of the present invention.

As previously explained, when a process is identified for sandboxing, an alternate service table is created with a number of hook routines installed. The hook routines can be configured for any number of purposes, such as for carrying out security checks and for monitoring for new thread creation. FIG. 4b illustrates a hook routine for dynamically sandboxing process threads that are newly created, in accordance with one embodiment of the present invention. Here, a hook is installed in the alternate SDT for the ZwCreateThread( ) system API. When a user mode thread within a sandboxed process creates a new thread, the ZwCreateThread hook installed into the alternate SDT will be executed.

The ZwCreateThread hook routine in this example operates as follows. The routine begins with calling 450 the native operating system service that creates thread objects (e.g., NtCreateThread). The hook function continues with determining 455 if the native operating system service has succeeded. Upon success, the hook routine continues with updating 460 the embedded service dispatch pointer (e.g., KTHREAD::SDT pointer) within the thread object with the address of the alternate SDT. The hook routine continues with returning 465 the call status (which is also the case if the native operating system service has not succeeded, as determined in 455). Return call status means that the status code that was returned by the native function (in this example embodiment NtCreateThread) is returned to the original function caller. So in the case where the native OS function is called and a failure occurs, that failure code is returned to the original function caller. It is in this manner that all of the threads within a current process can remain sandboxed.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for dynamically replacing a system call table for applications targeted for security checking, comprising:
    identifying a target process executing on a processor including threads associated with a global service descriptor table (SDT);
    allocating an alternate SDT for the target process;
    installing one or more security hook routines in the alternate SDT;
    changing the threads included in the target process from being associated with the global SDT to being associated with the alternate SDT, wherein threads of a plurality of other processes remain associated with the global SDT; and
    responsive to a thread of the target process creating a new thread, associating the new thread with the alternate SDT.

2. The method of claim 1 wherein upon a call issued by a thread of the target process, the method further comprises executing one or more of the security hook routines of the alternate SDT.

3. The method of claim 2 wherein in response to determining that the one or more security hook routines have completed execution, the method further comprises transferring control to a native service of the target process, or back to the calling thread with an error status.

4. The method of claim 3 wherein in response to the error status indicating that hook routine security checking failed, the method continues with remedial processing.

5. The method of claim 4 wherein the remedial processing includes at least one of sending a notification of malicious activity, identification of the malicious activity, impeding the malicious activity, containing the malicious activity, and observing the malicious activity.

6. A machine-readable storage medium encoded with executable instructions, that when executed by a processor, cause the processor to carry out a process for dynamically replacing a system call table for applications targeted for security checking, the process comprising:
    identifying a target process including threads associated with a global service descriptor table (SDT) object;
    allocating an alternate SDT for the target process;
    installing one or more security hook routines in the alternate SDT;
    changing the threads included in the target process from being associated with the global SDT to being associated with the alternate SDT, wherein threads of a plurality of other processes remain associated with the global SDT; and
    responsive to a thread of the target process creating a new thread, associating the new thread with the alternate SDT.

7. The machine-readable storage medium of claim 6 wherein upon a call issued by a thread of the target process, the process further comprises executing one or more of the security hook routines of the alternate SDT.

8. The machine-readable storage medium of claim 7 wherein in response to determining that the one or more security hook routines have completed execution, the process further comprises transferring control to a native service of the target process, or back to the calling thread with an error status.

9. The machine-readable storage medium of claim 8 wherein in response to the error status indicating that hook routine security checking failed, the process continues with remedial processing.

10. The machine-readable storage medium of claim 9 wherein the remedial processing includes at least one of sending a notification of malicious activity, identification of the malicious activity, impeding the malicious activity, containing the malicious activity, and observing the malicious activity.

11. A system for dynamically replacing a system call table for applications targeted for security checking, comprising:
  a storage medium for storing one or more security hook routines; and
  an alternate service descriptor table (SDT) module for:
    identifying a target process including threads associated with a global SDT;
    allocating an alternate SDT for the target process;
    installing one or more of the security hook routines from the storage medium in the alternate SDT;
    changing the threads included in the target process from being associated with the global SDT to being associated with the alternate SDT, wherein threads of a plurality of other processes remain associated with the global SDT; and
    responsive to a thread of the target process creating a new thread, associating the new thread with the alternate SDT.

12. The system of claim 11 wherein upon a call issued by a thread of the target process, the system executes one or more of the security hook routines of the alternate SDT.

13. The system of claim 12 wherein in response to determining that the one or more security hook routines have completed execution, the system transfers control to a native service of the target process, or back to the calling thread with an error status.

14. The system of claim 13 wherein in response to the error status indicating that hook routine security checking failed, the system executes remedial processing.

15. The system of claim 14 wherein the remedial processing includes at least one of sending a notification of malicious activity, identification of the malicious activity, impeding the malicious activity, containing the malicious activity, and observing the malicious activity.

16. A system for dynamically replacing a system call table for applications targeted for security checking, comprising:
  means for storing one or more security hook routines;
  means for identifying a target process including threads associated with a global service descriptor table (SDT);
  means for allocating an alternate SDT for the target process;
  means for installing one or more of the security hook routines from the means for storing in the alternate SDT;
  means for changing the threads included in the target process from being associated with the global SDT to being associated with the alternate SDT, wherein threads of a plurality of other processes remain associated with the global SDT; and
  means for associating a new thread with the alternate SDT, responsive to a thread of the target process creating the new thread.

17. The system of claim 16 further comprising a means for executing one or more of the security hook routines of the alternate SDT, upon a call issued by a thread of the target process.

* * * * *